US009680755B2

(12) United States Patent
Easty

(10) Patent No.: US 9,680,755 B2
(45) Date of Patent: Jun. 13, 2017

(54) APPARATUS FOR MANAGING LOCAL DEVICES

(71) Applicant: Mesh Networks, LLC, Houston, TX (US)

(72) Inventor: Allen Easty, Houston, TX (US)

(73) Assignee: MESH NETWORKS, LLC, Houston, TX (US)

( * ) Notice: Subject to any disclaimer, the term of this patent is extended or adjusted under 35 U.S.C. 154(b) by 0 days.

(21) Appl. No.: 15/089,132

(22) Filed: Apr. 1, 2016

(65) Prior Publication Data

US 2016/0308773 A1 Oct. 20, 2016

Related U.S. Application Data

(63) Continuation of application No. 13/415,002, filed on Mar. 8, 2012, now Pat. No. 9,325,514.

(51) Int. Cl.
| G06F 15/173 | (2006.01) |
| H04L 12/851 | (2013.01) |
| H04L 12/24 | (2006.01) |
| H04L 12/26 | (2006.01) |
| H04L 12/873 | (2013.01) |
| H04L 12/863 | (2013.01) |
| H04L 29/12 | (2006.01) |
| H04L 12/721 | (2013.01) |
| H04L 12/801 | (2013.01) |

(52) U.S. Cl.
CPC .......... *H04L 47/24* (2013.01); *H04L 12/2418* (2013.01); *H04L 41/24* (2013.01); *H04L 43/028* (2013.01); *H04L 43/0894* (2013.01); *H04L 43/16* (2013.01); *H04L 45/66* (2013.01); *H04L 47/52* (2013.01); *H04L 47/6215* (2013.01); *H04L 61/103* (2013.01); *H04L 47/29* (2013.01)

(58) Field of Classification Search
CPC ............ H04L 12/2418; H04L 12/2618; H04L 29/06884
USPC .................................................. 709/224, 200
See application file for complete search history.

(56) References Cited

U.S. PATENT DOCUMENTS

| 9,432,298 | B1* | 8/2016 | Smith | ................. H04L 49/9057 |
| 2002/0141379 | A1* | 10/2002 | Davari | ................. H04L 49/255 370/351 |
| 2007/0183433 | A1* | 8/2007 | Xie | ..................... H04L 63/0209 370/401 |
| 2009/0094401 | A1* | 4/2009 | Larson | .................... H04L 45/00 710/316 |

* cited by examiner

*Primary Examiner* — El Hadji Sall
(74) *Attorney, Agent, or Firm* — Patents on Demand P.A.; Brian K. Buchheit; Scott M. Garrett

(57) ABSTRACT

An apparatus for managing local devices, wherein the apparatus is operatively connectable with a network to manage network traffic. The apparatus can include computer instructions to identify and track a Media Access Control identifier using the network. The apparatus can also include computer instructions to direct traffic to a path associated with the Media Access Control identifier, computer instructions to measure the bit rate passing through the path associated with the Media Access Control identifier; and computer instructions to adjust the bit rate allowed to pass through the path. The decision to adjust the bit rate allowed to pass through the path can be determined using rolling quotas.

20 Claims, 4 Drawing Sheets

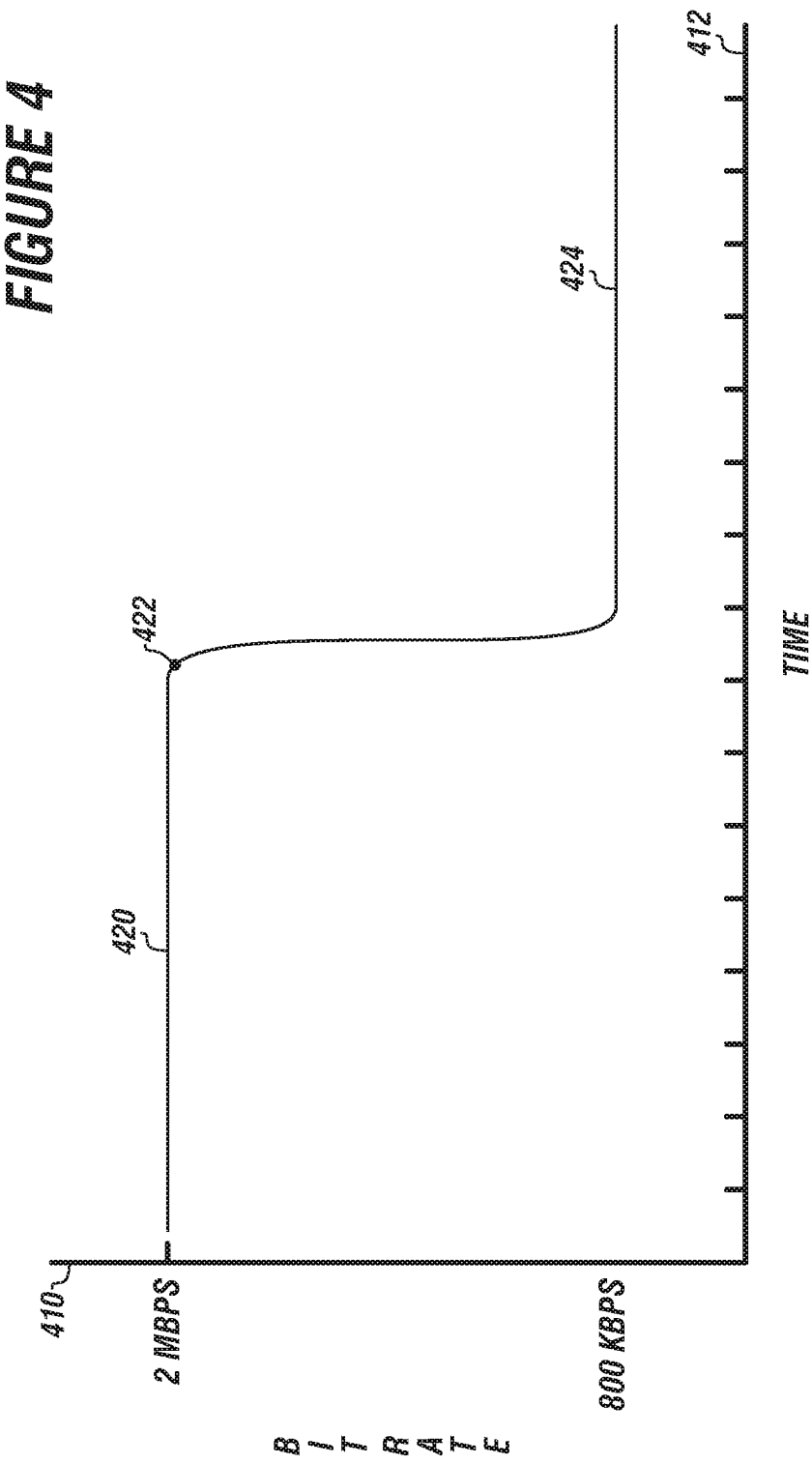

APPARATUS FOR MANAGING LOCAL DEVICES

CROSS REFERENCE TO RELATED APPLICATIONS

This application is a continuation of U.S. patent application Ser. No. 13/415,002, filed on Mar. 8, 2012, by Allen Easty, and entitled "Apparatus for Managing Local Devices," which is incorporated herein by reference in its entirety.

FIELD

The present embodiments generally relate to an apparatus for managing local devices.

BACKGROUND

A need exists for an apparatus that can function as an isolated system on a local area network in an efficient inexpensive way.

A further need exists for an apparatus that can function in an unobtrusive way and manages network traffic in an efficient manner.

The present embodiments meet these needs.

BRIEF DESCRIPTION OF THE DRAWINGS

The detailed description will be better understood in conjunction with the accompanying drawings as follows:

FIG. 4 depicts a graph of a rolling quota.

Figure 1:
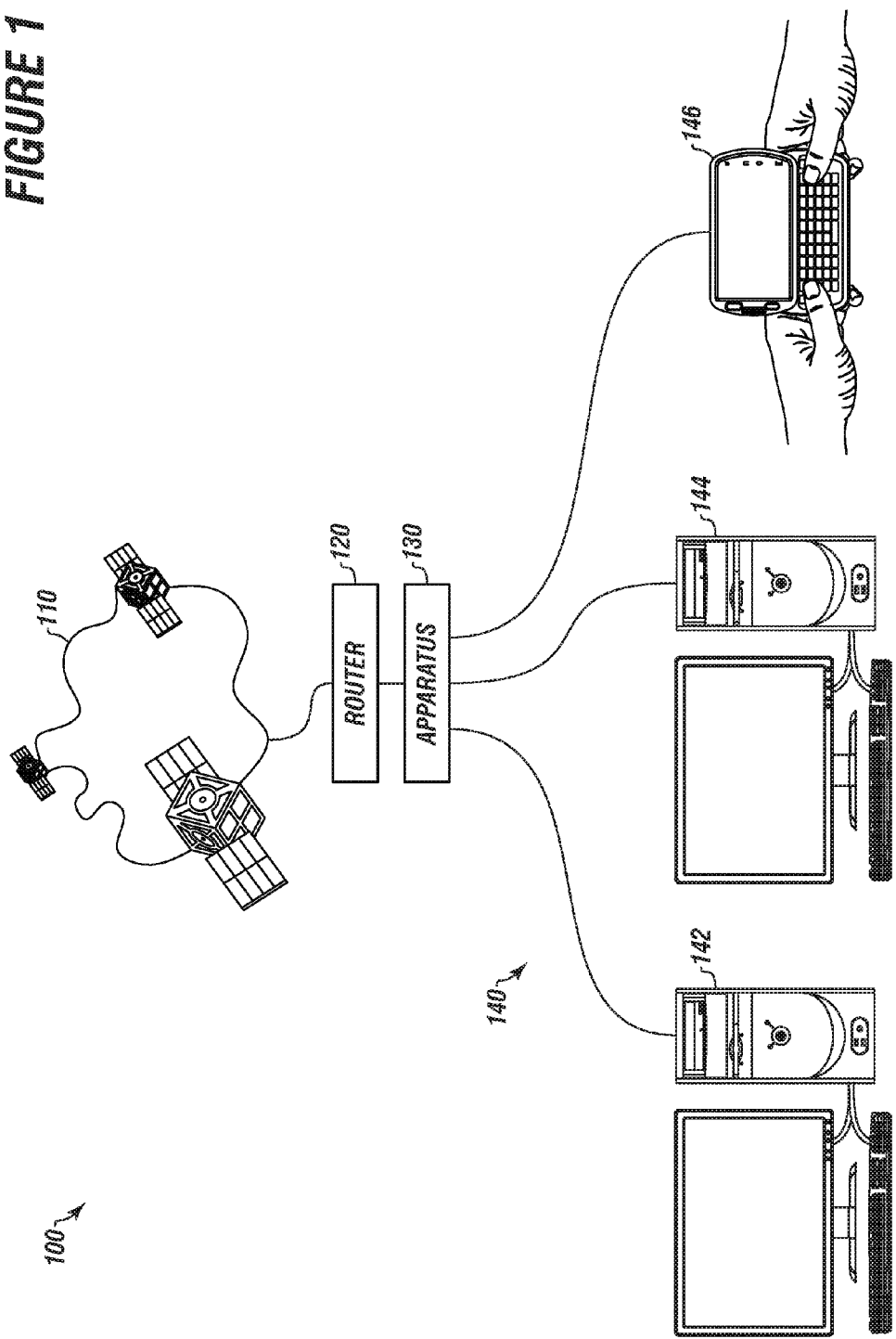
FIG. 1 depicts a schematic of a network with an apparatus for managing network traffic in communication therewith.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to an apparatus for managing local devices.

The apparatus for managing local devices can be operatively connectable with a network to manage network traffic.

The apparatus can include computer instructions to identify and track a client of a network. The apparatus can be configured to sniff and filter portions of upstream traffic for the Media Access Control (MAC) identifier, and Internet Protocol (IP) address are tracked against the Media Access Control identifier. The logic that the computer instruction to identify and track a client of the network is as follows: network client interfaces are identified by MAC address; the IP address is used to identify traffic for different levels of priority or bandwidth constraints. However, the IP address associated with a network interface thus MAC address may change. This system tracks the changes so that statistics used in determining service levels are maintained across IP addresses changes.

Accordingly, the Internet Protocol Addresses can be tracked and associated with the Media Access Control identifier.

The apparatus can include computer instructions to direct traffic to a path associated with the client. To direct traffic, the computer instructions can perform a multi-tier hashing algorithm to sort packets to quality of service queues for scalability to very large sites. The multi-tier hashing algorithm can first sort the Internet Protocol addresses based on the first set of numbers before the first period and assign the Internet Protocol addresses to appropriate first stage queue. The multi-tier hashing algorithm can perform a second sort of Internet Protocol addresses within each of the first stage queues based on the numbers of the Internet Protocol addresses that follow the first period and precede the second period and assign the Internet Protocol addresses to appropriate second stage queue. The multi-tier hashing algorithm can perform a third sort of Internet Protocol addresses within each of the second stage queues based on the numbers of the Internet Protocol addresses that follow the second period and precede the third period and assign the Internet Protocol addresses to appropriate third stage queue. The multi-tier hashing algorithm can perform a serial sort of the Internet Protocol addresses within each of the third stage queues based on the numbers of the Internet Protocol addresses that follow the third period and assign the Internet Protocol addresses to a traffic path associated with the Media Access Control identifier.

The apparatus can also include computer instructions to measure the bit rate traveling through the traffic paths associated with the Media Access Control identifier of the client. The measuring of bit rate traveling through the traffic paths can be accomplished using techniques that would be known to one skilled in the art with the aid of this disclosure. For example, data transiting the system with a sliding time window is used to make decisions in the system. The bytes counts for a given IP address are sampled on a periodic basis. A fixed number of these samples constitute the time window. A new sample is added and one discarded per each sample period. The window total is then recalculated. The apparatus can also include computer instructions to adjust the bit rate and priority of traffic on the paths associated with the Media Access Control identifier. For example, each path has queues associated on which Quality of Service algorithms supporting priorities and bit rate limits are implemented. The algorithms include (but are not limited to) Weighted Round Robin and Exponential Weighted Moving Average. The apparatus allows the ability to track network information and the ability to adjust the bit rate available to each Media Access Control identifier using rolling quotas, thereby creating fairness and preventing system abuse.

Two paths can be associated with each Media Access Control identifier. A first path can be incoming traffic and a second path can be outgoing traffic. The apparatus can include computer instructions to sniff and filter traffic in the second path. For example, outgoing data can be sniffed to provide notification of new client interfaces and their associated addresses, and outgoing data can be also sniffed to track IP address changes on existing client interfaces.

The apparatus can also include computer instructions to compile reports on the traffic associated with each Media Access Control identifier. The reports can be compiled in Extensible Markup Language (XML).

The apparatus can be configured to identify and track a plurality of Media Access Control identifiers.

The apparatus can include a management interface. The management interface can be a configuration software file that reads high limits, low limits, duration of window, ingoing network interfaces, outgoing network interfaces, quota time windows, quota threshold values. The management interface can provide a graphical representation of the high limits, low limits, duration of window, ingoing network interfaces, outgoing network interfaces, quota time windows, quota threshold values, or combinations thereof.

Turning now to the Figures, FIG. 1 depicts a schematic of a communication system with an apparatus for managing network traffic in communication therewith.

The communication system 100 can include a wide area network 110, a router 120, an apparatus 130, a local access network 140, and one or more client devices, such as a first client device 142, a second client device 144, and a third client device 146.

The wide area network 110 can be in communication with the router 120. The apparatus 130 can be connected between the router 120 and the local access network 140. The apparatus 130 can manage the amount of traffic that the first client 142, the second client device 144, and the third client device 146 are allowed to use.

Figure 2:
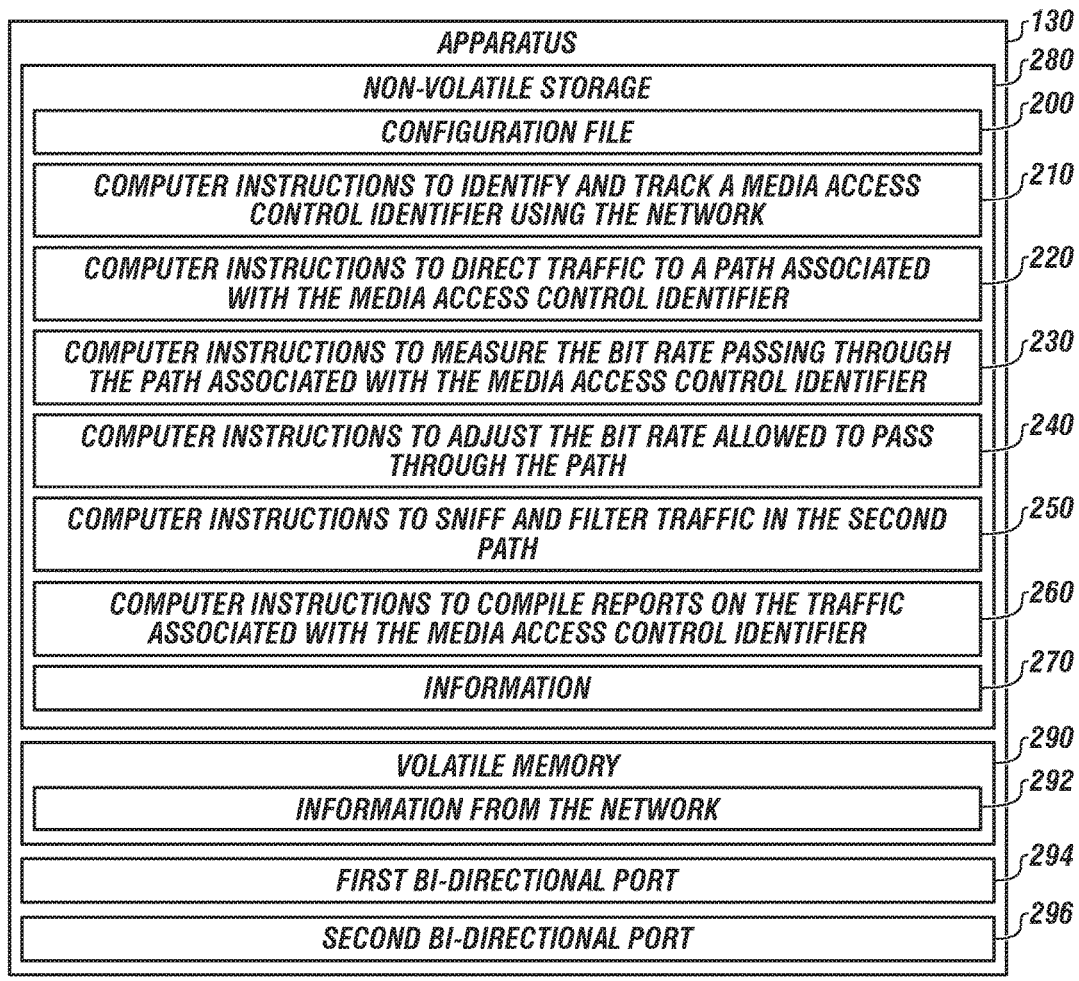
FIG. 2 depicts a schematic of the apparatus.

FIG. 2 depicts a schematic of the apparatus. The apparatus 130 can include non-volatile storage 280 that has a configuration file 200. The configuration file 200 can include computer instructions to identify and track a Media Access Control identifier using the network 210.

The non-volatile storage 280 can also include computer instructions to direct traffic to a path associated with the Media Access Control identifier 220.

The non-volatile storage 280 can include computer instructions to measure the bit rate passing through the path associated with the Media Access Control identifier 230.

The non-volatile storage 280 can also include computer instructions to adjust the bit rate allowed to pass through the path 240.

The non-volatile storage 280 can also include computer instructions to sniff and filter traffic in the second path 250.

The non-volatile storage 280 can also include computer instructions to compile reports on the traffic associated with the Media Access Control identifier 260.

The non-volatile storage 280 can also include information 270. The information can be basic network identification, normal and penalty limits, and quota window period and thresholds.

The apparatus 130 can also have volatile memory 290 that can record information from the network 292. The information Media Control Identifiers, IP addresses, and samples get totaled to calculate the quota period counts.

The apparatus 130 can also include a first bi-directional port 294 and a second bi-directional port 296. The apparatus 130 can use the network to acquire the information from the network 292. The apparatus 130 can have additional hardware, known to those skilled in the art, which allows for control of the bit rate flowing therethrough.

Figure 3:
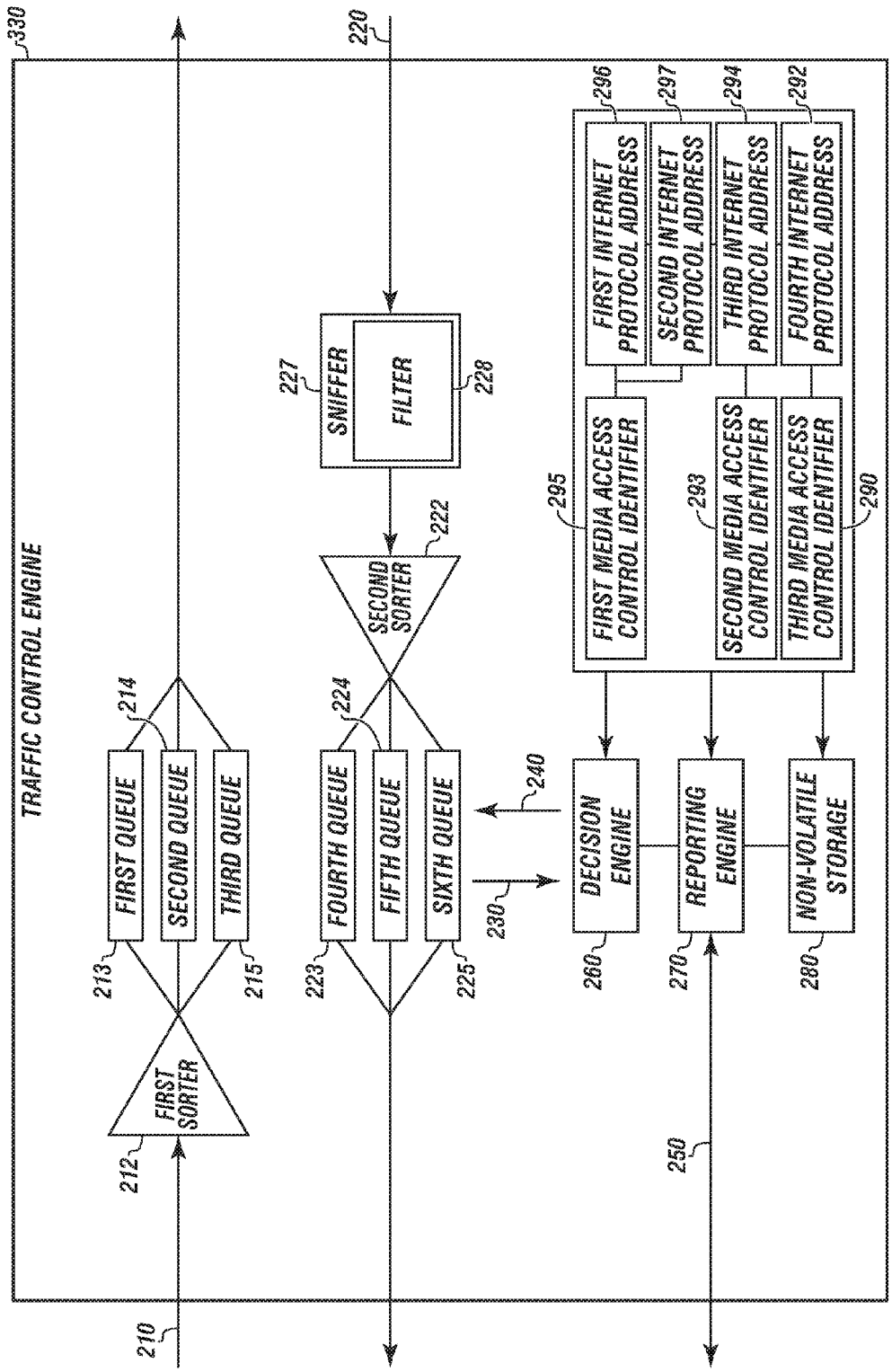
FIG. 3 depicts a schematic of a traffic control engine.

FIG. 3 depicts a schematic of a traffic control engine. The traffic control engine 330 can be formed by the computer instructions described herein.

The traffic control engine 330 can include a first path 210 and a second path 220. A first sorter 212 can sort traffic in the first path 210. The traffic in the first path 220 can be sorted into a first queue 213, a second queue 214, or a third queue 215 based on the Internet Protocol addresses associated with the traffic. The first queue 213 can be associated with a first Internet Protocol address 296 and a second Internet Protocol address 297 associated with a first Media Access Control identifier 295. The second queue 214 can be associated with a third Internet Protocol address 294 associated with a second Media Access Control identifier 293.

The third queue 215 can be associated with a fourth Internet Protocol address 292 associated with a third Media Access Control identifier 290.

The traffic control engine 330 can also include a second path 220. The second path can include a sniffer 227 and a filter 228. The sniffer 227 and filter 228 can selectively inspect and filter data on Internet protocol addresses and Media Access Control identifiers associated with traffic transferred in the path. The sniffer 227 checks the IP addresses against existing MAC in the new system or new clients and their associated MAC/IPs.

A second sorter 222 can be in communication with the second path 220. The second sorter 222 can sort the traffic into a fourth queue 223, a fifth queue 224, and a sixth queue 225 based on the Internet Protocol addresses associated with the traffic. The fourth queue 223 can be associated with a first Internet Protocol address 296 and a second Internet Protocol address 297 associated with a first Media Access Control identifier 295. The fifth queue 224 can be associated with a third Internet Protocol address 294 associated with a second Media Access Control identifier 293. The sixth queue 225 can be associated with a fourth Internet Protocol address 292 associated with a third Media Access Control identifier 290.

A counter 230 can monitor and count the traffic in the queues 213, 214, 215, 223, 224, and 225. The counter 230 can transfer the acquired data to a decision engine 260. The decision engine 260 can determine if the traffic associated with the queues are above a data quota based on the data transferred thereto. The decision engine 260 can issue command 240 to decrease or increase the data allowed to be transferred through each queue 213, 214, 215, 223, 224, and 225. The decision engine 260 can make the decisions using a rolling quota.

A reporting engine 270 can store data transferred to and sent from the decision engine 260. The reporting engine 270 can send the information to a management interface 250. The information can be organized as XML or JSON and queried through a REST interface. The traffic control engine 330 can also include non-volatile storage 280.

FIG. 4 depicts a graph of a rolling quota. The graph includes a y-axis 410 and an x-axis 412. The y-axis 410 can represent the data transfer, such as in terms of bit rate. The x-axis 412 can represent time. The line maximum quota limit 420 can be 2 MBPS. At point 422 a client has exceeded the quota limit and the traffic is limited to a penalty level 424.

The usage can be calculated in intervals. The intervals can be every 15 minutes, one hour, one day or other unit of time. Usage for a quota interval, also called a window, is recalculated frequently in comparison with the quota interval— every minute for example. If the recalculated traffic count for the preceding interval exceeds the quota limit, the traffic rate limit is set to the penalty value. If in a future recalculation the traffic for the preceding interval falls below the quota limit, the traffic rate limit is set to the normal, non-penalty, value.

The rolling quota is able to punish automated traffic that is often associated with file sharing or other automated usage of data. The rolling quota can control automated file sharing without having to identify of the file sharing software. It does so by selecting quota intervals that exceed the amount of time a human will engage, or desire to engage, in continuous, high bandwidth activity. Humans that engage in high bandwidth activity for unusually long periods of time or automated software that engages in high or unlimited bandwidth activity for very long or unlimited periods of time are penalized. As the rolling quota uses only network statistics as opposed to deeper inspection of the network traffic, the systems employed can be efficient and inexpensive.

While these embodiments have been described with emphasis on the embodiments, it should be understood that within the scope of the appended claims, the embodiments might be practiced other than as specifically described herein.

What is claimed is:

1. An apparatus comprising:
a path sorter configured to:
assign a first network address of a computer network to a first queue that corresponds to a first level of network traffic priority; and
sort a first set of data packets received along a path of the computer network into the first queue, wherein the first set of data packets include the first network address; and a traffic control engine configured to:
track the first network address to a physical address identifier associated with a device interface;
measure a data rate of the first set of data packets traversing over the path for the physical address identifier; and
adjust a data rate of the path for the physical address identifier and a priority level of the first level of network traffic priority according to a rolling quota and the measured data rate.

2. The apparatus of claim 1, further comprising:
a second path sorter configured to:
assign the first network address to a second queue that corresponds to a second level of network traffic priority; and
sort a second set of data packets received along a second path of the computer network into the second queue, wherein the second set of data packets include the first network address, wherein the traffic control engine is further configured to adjust a data rate of the second path for the physical address identifier and a priority level of the second level of network traffic priority according to the rolling quota and the measured data rate.

3. The apparatus of claim 1, wherein the first level of network traffic priority is determined from one or more bandwidth constraints.

4. The apparatus of claim 1, wherein the rolling quota includes a threshold bit rate limit, and wherein the traffic control engine is configured to adjust the data rate by performing at least the following:
determine whether the measured data rate exceeds the threshold bit rate limit; and
adjust the data rate of the path to a penalty data rate level.

5. The apparatus of claim 1, wherein the rolling quota includes an interval of time and a quota data limit, and wherein the traffic control engine is configured to adjust the data rate by performing at least the following:
determine whether the amount of data transferred during the interval time exceeds the quota data limit; and
adjust the data rate of the path to a penalty data rate level.

6. The apparatus of claim 1, wherein the traffic control engine is configured to adjust the data rate of the path by increasing or decreasing an amount of data transferred through the first queue.

7. The apparatus of claim 1, wherein the path sorter is further configured to assign a second network address of the computer network to a second queue that corresponds to a second level of network traffic priority, wherein the second level of network traffic priority has a priority level that differs from the first level of network traffic priority.

8. An apparatus comprising:
at least one processor; and
a non-transitory computer readable medium having instructions when executed by the at least one processor, causes the apparatus to:
assign a first network address of a computer network to a first queue associated with a first level of network traffic priority;
sort a first set of data packets received along a path of the computer network into the first queue, wherein the first set of data packets are sorted based on the first network address;
map the first network address to a physical address identifier associated with a local device;
measure a data rate of the first set of data packets traversing over the path for the physical address identifier; and
adjust a data rate of the path for the physical address identifier and a priority level of the first level of network traffic priority based on a rolling quota and the measured data rate.

9. The apparatus of claim 8, wherein the instructions further cause the apparatus to: assign the first network address to a second queue that corresponds to a second level of network traffic priority;
sort a second set of data packets received along a second path of the computer network into the second queue, wherein the second set of data packets include the first network address; and
adjust the data rate on the second path for the physical address identifier and a priority level of the second level of network traffic priority based on the rolling quota and the measured data rate.

10. The apparatus of claim 8, wherein the rolling quota includes a threshold bit rate limit, and where the instructions cause the apparatus to adjust the data rate by performing at least the following:
determine whether the data rate exceeds the threshold bit rate limit; and limit the data rate of the path to a penalty data rate level.

11. The apparatus of claim 8, wherein the first level of network traffic priority is determined from one or more bandwidth constraints.

12. The apparatus of claim 8, wherein the rolling quota includes an interval of time and a quota data limit, and wherein the instructions cause the apparatus to adjust the data rate by performing at least the following:
determine whether the amount of data transferred during the interval time exceeds the quota data limit; and
limit the data rate of the path to a penalty data rate level.

13. The apparatus of claim 8, wherein the instructions further cause the apparatus to assign a second network address of the computer network to a second queue that corresponds to a second level of network traffic priority, wherein the second level of network traffic priority has a priority level that differs from the first level of network traffic priority.

14. The apparatus of claim 8, wherein the instructions further cause the apparatus to adjust the data rate of the path by increasing or decreasing an amount of data transferred through the first queue.

15. A computer-implemented method, comprising:
assigning, using a traffic control engine, a first network address of a computer network to a first queue that corresponds to a first level of network traffic priority;

sorting, using the traffic control engine, a first set of data packets received along a path of the computer network into the first queue, wherein the first set of data packets include the first network address;

tracking, using the traffic control engine, the first network address to a physical address identifier associated with a network device;

measuring, using the traffic control engine, a data rate of the first set of data packets traversing over the path for the physical address identifier; and adjusting, using the traffic control engine, a data rate of the path for the physical address identifier and a priority level of the first level of network traffic priority using a rolling quota and the measured data rate.

16. The method of claim 15, further comprising assigning, using the traffic control engine, the first network address to a second queue that corresponds to a second level of network traffic priority;

sorting, using the traffic control engine, a second set of data packets received along a second path of the computer network into the second queue, wherein the second set of data packets include the first network address; and adjusting, using the traffic control engine, the data rate on the second path for the physical address identifier and a priority level of the second level of network traffic priority using the rolling quota and the measured data rate.

17. The method of claim 15, wherein the first level of network traffic priority is determined from one or more bandwidth constraints.

18. The method of claim 15, wherein the rolling quota includes a threshold bit rate limit, and wherein adjusting a data rate comprises:

determining, using the traffic control engine, whether the measured data rate exceeds the threshold bit rate limit; and limit, using the traffic control engine, the data rate of the path to a penalty data rate level.

19. The method of claim 15, further comprising assigning, using the traffic control engine, a second network address of a computer network to a second queue that corresponds to a second level of network traffic priority that differs from the first level of network traffic priority.

20. The method of claim 15, wherein the rolling quota includes an interval of time and a quota data limit and wherein adjusting a data rate comprises:

determining, using the traffic control engine, whether the amount of data transferred during the interval time exceeds the quota data limit; and limiting, using the traffic control engine, the data rate of the path to a penalty data rate level.

* * * * *